US009973460B2

(12) United States Patent
Abou Mahmoud et al.

(10) Patent No.: US 9,973,460 B2
(45) Date of Patent: May 15, 2018

(54) FAMILIARITY-BASED INVOLVEMENT ON AN ONLINE GROUP CONVERSATION

(71) Applicant: INTERNATIONAL BUSINESS MACHINES CORPORATION, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/193,170

(22) Filed: Jun. 27, 2016

(65) Prior Publication Data
US 2017/0373999 A1 Dec. 28, 2017

(51) Int. Cl.
H04L 12/58 (2006.01)
H04L 29/08 (2006.01)

(52) U.S. Cl.
CPC ............ H04L 51/16 (2013.01); H04L 51/063 (2013.01); H04L 51/32 (2013.01); H04L 67/306 (2013.01)

(58) Field of Classification Search
None
See application file for complete search history.

(56) References Cited

U.S. PATENT DOCUMENTS

| 8,375,308 | B2 | 2/2013 | Fuchs et al. |
| 8,984,422 | B2 | 3/2015 | Eidelson et al. |
| 9,092,742 | B1* | 7/2015 | Zeng ............... G06K 9/6256 |
| 2007/0011270 | A1 | 1/2007 | Klein et al. |
| 2012/0072497 | A1 | 3/2012 | Steiert |
| 2013/0007137 | A1 | 1/2013 | Azzam et al. |
| 2013/0024577 | A1 | 1/2013 | Krishnaswamy et al. |

(Continued)

OTHER PUBLICATIONS

Anonymous, "Familiarity Based Expectation and Attention Management," An IP.com Prior Art Database Technical Disclosure, Oct. 23, 2014, pp. 1-3, IP.com No. IPCOM000239249D.

(Continued)

Primary Examiner — Thomas Dailey
Assistant Examiner — Abderrahmen Chouat
(74) Attorney, Agent, or Firm — Reza Sarbakhsh; Robert C. Bunker

(57) ABSTRACT

A method for providing suggested modifications to user messages is provided. The method may include receiving user messages associated with a communication application. The method may further include collecting communication application data comprising user information associated with users and group information associated with a group. Additionally, the method may include analyzing the collected communication application data. The method may also include determining user expertise levels associated with users. The method may further include determining message precision levels associated with the received user messages. The method may also include providing suggested modifications to the received user messages. The method may further include posting at least one version of the received user messages on the communication application, wherein the at least one version of the received user messages is based on users editing or not editing the received user messages in response to the provided suggested modifications.

17 Claims, 5 Drawing Sheets

(56) References Cited

U.S. PATENT DOCUMENTS

| | | | |
|---|---|---|---|
| 2013/0054708 A1 | 2/2013 | Bhatt et al. | |
| 2013/0204833 A1* | 8/2013 | Pang | G06Q 30/02 |
| | | | 706/52 |
| 2015/0033153 A1 | 1/2015 | Knysz et al. | |
| 2015/0088906 A1 | 3/2015 | Pal et al. | |
| 2015/0156268 A1 | 6/2015 | Lev et al. | |
| 2015/0207765 A1 | 7/2015 | Brantingham et al. | |
| 2015/0302846 A1 | 10/2015 | Song et al. | |
| 2015/0331849 A1 | 11/2015 | Porat | |
| 2016/0048772 A1* | 2/2016 | Bruno | G06N 5/04 |
| | | | 706/11 |

OTHER PUBLICATIONS

Marett et al., "The Role of Relational Familiarity When Interpreting Family Business Communication," IEEE Transactions on Professional Communication, Mar. 2015, pp. 69-85, vol. 58, Issue 1.

Mell et al., "The NIST Definition of Cloud Computing," National Institute of Standards and Technology, Sep. 2011, pp. 1-3, Special Publication 800-145.

* cited by examiner

FAMILIARITY-BASED INVOLVEMENT ON AN ONLINE GROUP CONVERSATION

BACKGROUND

The present invention relates generally to the field of computing, and more specifically, to online communications.

Generally, online communication sites and applications may connect users and information and enable users to share and process information. Typical online communication sites/applications may include social networking sites/applications, online forums, online chats, email, and activity streams. Furthermore, users may be enabled to post comments and messages on the social networking sites/applications, online forums, online chats, email, and activity streams. For example, a user may start working on a project and may join an online support forum to interact with different users who may or may not be associated with the project but are members of the online support forum. Thereafter, the user may post a comment or question on the online support forum such as, "what is going on with gadget A?" Thereafter, based on the different users that are members of the online group forum, the user's comment/question may receive a response.

SUMMARY

A method for providing at least one suggested modification to at least one user message is provided. The method may include receiving the at least one user message associated with at least one communication application in response to a user action associated with at least one user. The method may further include collecting a plurality of communication application data based on the received at least one user message, wherein the plurality of communication application data comprises a plurality of user information associated with the at least one user and a plurality of group information associated with at least one group that is addressed by the received at least one user message. Additionally, the method may include analyzing the collected plurality of communication application data. The method may also include determining at least one user expertise level associated with the at least one user based on the analyzed plurality of communication application data. The method may further include determining at least one message precision level associated with the received at least one user message based on the analyzed plurality of communication application data and the determined at least one expertise level. The method may also include providing the at least one suggested modification to the received at least one user message based on the analyzed plurality of communication application data, the determined at least one user expertise level, and the determined at least one message precision level. The method may further include posting at least one version of the received at least one user message on the at least one communication application, wherein the at least one version of the received at least one user message is based on the at least one user editing or not editing the received at least one user message in response to the provided at least one suggested modification.

A computer system for providing at least one suggested modification to at least one user message is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the at least one user message associated with at least one communication application in response to a user action associated with at least one user. The method may further include collecting a plurality of communication application data based on the received at least one user message, wherein the plurality of communication application data comprises a plurality of user information associated with the at least one user and a plurality of group information associated with at least one group that is addressed by the received at least one user message. Additionally, the method may include analyzing the collected plurality of communication application data. The method may also include determining at least one user expertise level associated with the at least one user based on the analyzed plurality of communication application data. The method may further include determining at least one message precision level associated with the received at least one user message based on the analyzed plurality of communication application data and the determined at least one expertise level. The method may also include providing the at least one suggested modification to the received at least one user message based on the analyzed plurality of communication application data, the determined at least one user expertise level, and the determined at least one message precision level. The method may further include posting at least one version of the received at least one user message on the at least one communication application, wherein the at least one version of the received at least one user message is based on the at least one user editing or not editing the received at least one user message in response to the provided at least one suggested modification.

A computer program product for providing at least one suggested modification to at least one user message is provided. The computer program product may include one or more computer-readable storage devices and program instructions stored on at least one of the one or more tangible storage devices, the program instructions executable by a processor. The computer program product may include program instructions to receive the at least one user message associated with at least one communication application in response to a user action associated with at least one user. The computer program product may also include program instructions to collect a plurality of communication application data based on the received at least one user message, wherein the plurality of communication application data comprises a plurality of user information associated with the at least one user and a plurality of group information associated with at least one group that is addressed by the received at least one user message. Additionally, the computer program product may further include program instructions to analyze the collected plurality of communication application data. The computer program product may also include program instructions to determine at least one user expertise level associated with the at least one user based on the analyzed plurality of communication application data. The computer program product may further include program instructions to determine at least one message precision level associated with the received at least one user message based on the analyzed plurality of communication application data and the determined at least one expertise level. The computer program product may also include program instructions to provide the at least one suggested modification to the received at least one user message based on the analyzed plurality of communication application data, the determined at least one user expertise level, and the determined at least one message precision level. The computer program product may further include program instructions to post at least one version of the received at least one user message on the at least one communication application, wherein the at least one version of the received at least one user message is based on the at least one user editing or not editing the received at least one user message in response to the provided at least one suggested modification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
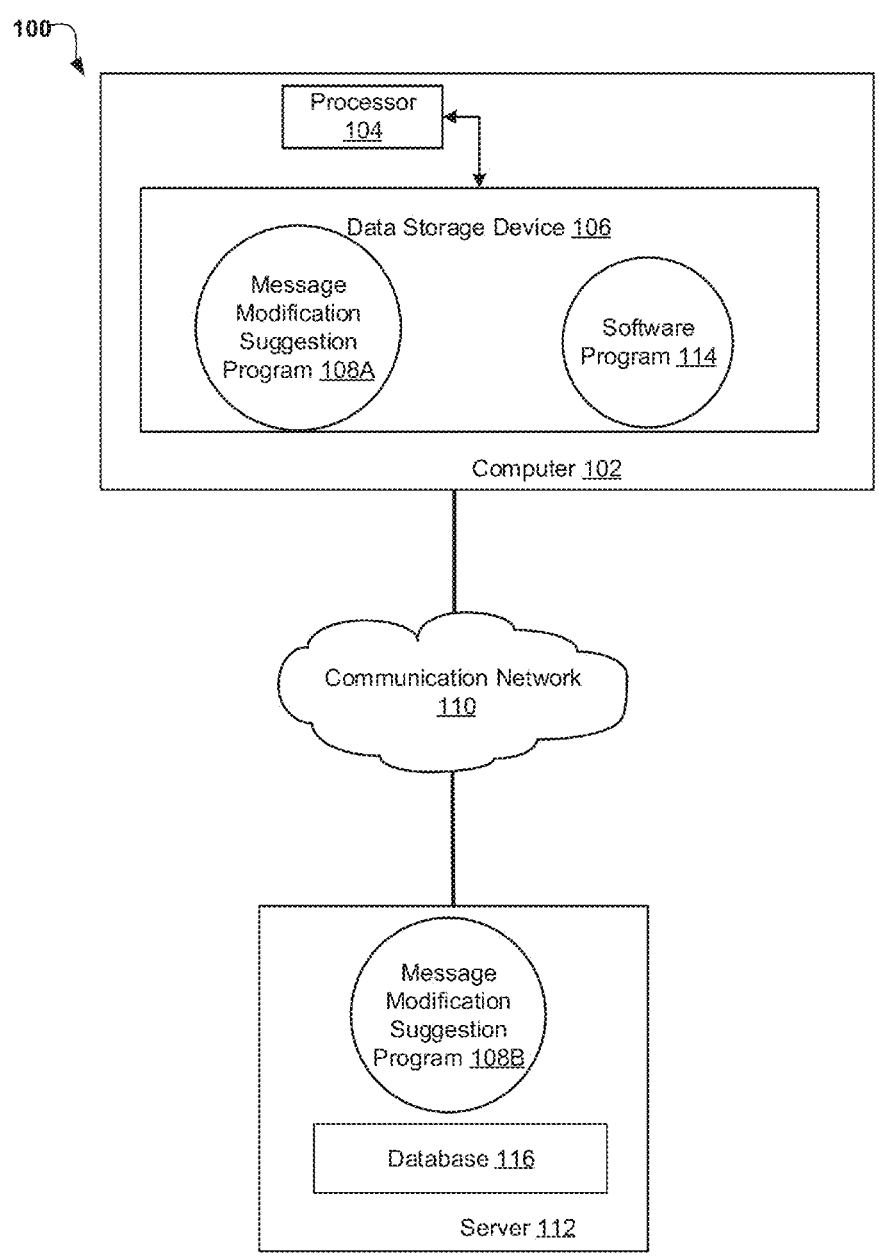
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to online communications. The following described exemplary embodiments provide a system, method and program product for providing suggested modifications to user messages associated with online communication applications. Therefore, the present embodiment has the capacity to improve the technical field associated with online communications by improving online interactions between users with different levels of expertise associated with communication applications. Specifically, the present embodiment may receive user messages associated with communication applications, determine users' level of expertise with the communication application based on the received user messages and communication application data, and provide suggested modifications to the received user messages based on the determined users' level of expertise and the communication application data to improve user experience with the communication application.

As previously described with respect to online communications, users may be enabled to post comments and messages on online communication sites/applications such as social networking sites and applications, online forums, online chats, email, and activity streams. For example, and as previously described, a user may start working on a project and may join an online support forum to interact with different users who may or may not be associated with the project but are members of the online support forum. Thereafter, the user may post a comment or question on the online support forum such as, "what is going on with gadget A?" However, comments and questions posted on online communication sites and applications, such as the online support group forum, may adhere to implied standards and structures that are unknown to users with different levels of expertise associated with the online communication site and/or application. Specifically, for example, the user may be a new member to the online support group forum, and the posted comment/question, "what is going on with gadget A," may not adhere to the implied structure associated with comments/questions that are typically posted on the online support group forum by more experienced users. Therefore, the posted comment/question, "what is going on with gadget A," may not illicit a response. As such, it may be advantageous, among other things, to provide a system, method and program product for providing suggested modifications to messages associated with online communication applications. Specifically, the system, method, and program product may receive user messages associated with communication applications, determine users' level of expertise with the communication application based on the received user messages and communication application data, and provide suggested modifications to the received user messages based on the determined users' level of expertise and the communication application data to improve user experience with the communication application.

According to at least one implementation of the present embodiment, user messages associated with communication applications may be received. Next, based on the received user messages, communication application data associated with the communication application may be collected. Then, the collected communication application data may be analyzed. Next, based on the received user messages and the analyzed communication application data, user expertise levels may be determined. Then, based on the received user messages, the analyzed communication application data, and the determined user expertise levels, message precision levels may be determined. Next, based on the message precision levels, suggested modifications to the received user messages may be provided. Then, in response to user actions, at least one version of the received user messages may be posted on the communication application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for providing suggested modifications to user messages.

According to at least one implementation, user messages associated with communication applications may be received. Next, based on the received user messages, communication application data associated with the communication application may be collected. Then, the collected communication application data may be analyzed. Next, based on the received user messages and the analyzed communication application data, user expertise levels may be determined. Then, based on the received user messages, the analyzed communication application data, and the determined user expertise levels, message precision levels may be determined. Next, based on the message precision levels, suggested modifications to the received user messages may be provided. Then, in response to user actions, at least one version of the received user messages may be posted on the communication application.

Referring now to FIG. 1, an exemplary networked computer environment 100 in accordance with one embodiment is depicted. The networked computer environment 100 may include a computer 102 with a processor 104 and a data storage device 106 that is enabled to run a message modification suggestion program 108A and a software program 114. The software program 114 may be an application program such as a social networking site/application, an email site/application, an online forum, an online chat, and an activity stream. The message modification suggestion program 108A may communicate with the software program 114. The networked computer environment 100 may also include a server 112 that is enabled to run a message modification suggestion program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the message modification suggestion program 108A, 108B may interact with a database 116 that may be embedded in various storage devices, such as, but not limited to a mobile device 102, a networked server 112, or a cloud storage service.

According to the present embodiment, a program, such as a message modification suggestion program 108A and 108B may run on the client computer 102 or on the server computer 112 via a communications network 110. The message modification suggestion program 108A, 108B may provide suggested modifications to user messages associated with communication applications. Specifically, a user using a computer, such as computer 102, may run a message modification suggestion program 108A, 108B, that interacts with a software program 114, to receive user messages associated with communication applications, detect users' level of expertise with the communication application based on the received user messages and communication application data, and provide suggested modifications to the received user messages based on the detected users' level of expertise and the communication application data to improve user experience with the communication application.

Figure 2:
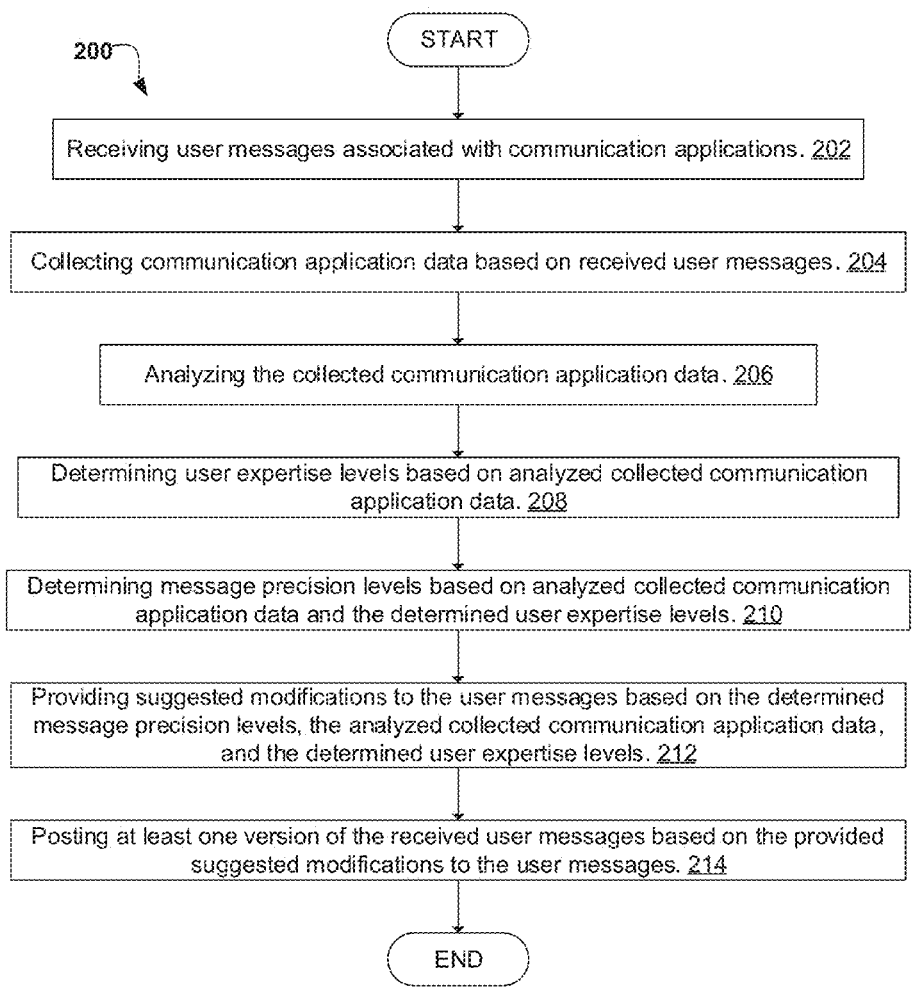
FIG. 2 is an operational flowchart illustrating the steps carried out by a program for providing suggested modifications to user messages according to one embodiment.

Referring now to FIG. 2, an operational flowchart 200 illustrating the steps carried out by a program 108A, 108B (FIG. 1) for providing suggested modifications to user messages is depicted. At 202, the message modification suggestion program 108A, 108B (FIG. 1) may receive user messages associated with communication applications. Specifically, based on user input, the message modification suggestion program 108A, 108B (FIG. 1) may receive user messages associated with communication applications that may include social networking sites/applications, email sites/applications, online forums, online chats, and activity streams. For example, the message modification suggestion program 108A, 108B (FIG. 1) may interact with a software program 114 (FIG. 1), such as an online group forum, and based on user input, such as a user typing on a dialogue box and clicking ENTER, the message modification suggestion program 108A, 108B (FIG. 1) may receive a message such as, "what is going on with the baseball team?"

Then, at 204, based on the received user messages, the message modification suggestion program 108A, 108B (FIG. 1) may collect communication application data associated with the communication application. As previously described at step 202, based on user input, the message modification suggestion program 108A, 108B (FIG. 1) may receive user messages associated with communication applications that may include social networking sites/applications, email sites/applications, online forums, online chats, and activity streams. Thereafter, the message modification suggestion program 108A, 108B (FIG. 1) may collect data associated with the communication applications and the communication application data may include user information and group information, whereby the group information is based on the groups addressed by the received user messages on the communication applications. Specifically, the message modification suggestion program 108A, 108B (FIG. 1) may collect user information such as user profile information, user location data, user activity, user last login, terms used in the received user messages, previous user messages, and frequent terms used in the previous user messages. Furthermore, the message modification suggestion program 108A, 108B (FIG. 1) may collect group information such as group profile information, group location data, group activity, previous group messages, and frequent terms used in the previous group messages.

Next, at 206, the message modification suggestion program 108A, 108B (FIG. 1) may analyze the collected communication application data. Specifically, according to one embodiment, the message modification suggestion program 108A, 108B (FIG. 1) may analyze the collected communication application data by analyzing the user information and comparing the analyzed user information to the group information. For example, and as previously described at step 204, the message modification suggestion program 108A, 108B (FIG. 1) may collect user information such as user profile information, user location data, user activity, user last login, terms used in the received user messages, previous user messages, and frequent terms used in the previous user messages based on receiving a message associated with an online group forum. Thereafter, the message modification suggestion program 108A, 108B (FIG. 1) may compare the user information associated with the online group forum to the group information. Specifically, for example, the message modification suggestion program 108A, 108B (FIG. 1) may compare the user profile information to the group profile information, the user activity to the group activity, and the terms used in the received user messages to the terms used in previous group messages.

Then, at 208, the message modification suggestion program 108A, 108B (FIG. 1) may determine user expertise levels associated with the communication applications based on the analyzed communication application data. Specifically, according to one embodiment, the message modification suggestion program 108A, 108B (FIG. 1) may determine the user expertise levels by determining whether the user is a novice, intermediate, or expert on the communication applications based on the analyzed communication application data. More specifically, and as previously described at step 206, the message modification suggestion program 108A, 108B (FIG. 1) may collect and analyze user information that may include user profile information, user location data, user activity, user last login, terms used in the received user messages, previous user messages, and frequent terms used in the previous user messages. For example, based on the collected and analyzed user information, the message modification suggestion program 108A, 108B (FIG. 1) may determine that a user logged on to an online group forum for the first time and that a received user message associated with the user is the first received user message associated with the online group forum. Therefore, the message modification suggestion program 108A, 108B (FIG. 1) may determine that the user expertise level for the user is novice.

Next, at 210, the message modification suggestion program 108A, 108B (FIG. 1) may determine message precision levels associated with the received user messages based on the analyzed communication application data and the determined expertise levels. Specifically, according to one embodiment, the message modification suggestion program 108A, 108B (FIG. 1) may determine the message precision levels by determining whether the received user messages are imprecise, moderately precise, or precise based on the analyzed communication application data and the determined expertise levels. For example, and as previously described at step 202, the message modification suggestion program 108A, 108B (FIG. 1) may receive a user message, such as "what is going with the baseball team," that is associated with an online group forum. Thereafter, and as previously described at steps 204 and 206, the message modification suggestion program 108A, 108B (FIG. 1) may collect and analyze communication application data associated with the received user message and the communication application. For example, the message modification suggestion program 108A, 108B (FIG. 1) may analyze the received user messages by determining the number of words, complexity, natural language processing terms, and prior topic expertise associated with the received user messages. Then, and as previously described at step 208, based on the analyzed communication data, the message modification suggestion program 108A, 108B (FIG. 1) may determine that the user expertise level is novice. Furthermore, the message modification suggestion program 108A, 108B (FIG. 1) may use the analyzed communication data to determine that the message precision level associated with the received user message, "what is going on with the baseball team," is imprecise. Specifically, the message modification suggestion program 108A, 108B (FIG. 1) may use the analyzed term "baseball team", and compare the analyzed term to previous group messages and frequent terms used in the previous group messages to determine that "baseball team" is a general term compared to more specific terms, such as "Boston Red Sox," that are used in the previous group messages.

Then, at 212, the message modification suggestion program 108A, 108B (FIG. 1) may provide suggested modifications to the received user messages based on the analyzed communication application data, the determined user expertise levels, and the determined message precision levels. Specifically, the message modification suggestion program 108A, 108B (FIG. 1) may provide suggestion modifications to the received user messages by presenting the suggested modifications on a window associated with the communication application or on a pop-up dialogue box, and the suggested modifications may include comments and/or questions on how to revise the received user messages. More specifically, and according to one embodiment, the message modification suggestion program 108A, 108B (FIG. 1) may present the dialogue box with comments/questions that may include comment/questions such as "have you tried . . . ," "have you included . . . ," and "have you checked . . . ." Additionally, according to one embodiment, the message modification suggestion program 108A, 108B (FIG. 1) may present the dialogue box with a moderator to enable a chat session between the user and the moderator on how to revise the received user messages. Furthermore, according to one embodiment, the message modification suggestion program 108A, 108B (FIG. 1) may present the dialogue with previous group messages that received responses and that are similar to the received user messages. For example, based on the received user message, "what is going on with the baseball team," the message modification suggestion program 108A, 108B (FIG. 1) may present a dialogue box with the question, "have you tried changing the term 'baseball team' to 'Boston Red Sox' or more specific terms?" Furthermore, the message modification suggestion program 108A, 108B (FIG. 1) may present previous group messages similar to the received user message, "what is going on with the baseball team."

Next, at 214, based on user actions, the message modification suggestion program 108A, 108B (FIG. 1) may post at least one version of the received user messages. As previously described at step 212, the message modification suggestion program 108A, 108B (FIG. 1) may provide suggested modifications to the received user messages based on the analyzed communication data, the determined user expertise levels, and the determined message precision levels. Therefore, based on the provided suggested modifications, the message modification suggestion program 108A, 108B (FIG. 1) may receive user actions that may or may not include receiving user modifications to the received user messages. As such, the message modification suggestion program 108A, 108B (FIG. 1) may post at least one version of the received user messages based on the user actions. For example, in response to provided suggested modifications to the received user message, "what is going with the baseball team," the message modification suggestion program 108A, 108B (FIG. 1) may receive a user action such as the user changing the term "baseball team" to "Boston Red Sox." Thereafter, the message modification suggestion program 108A, 108B (FIG. 1) may post a version of the received user message such as "what is going on with the Boston Red Sox?"

It may be appreciated that FIG. 2 provides only an illustration of one implementation and does not imply any limitations with regard to how different embodiments may be implemented. Many modifications to the depicted environments may be made based on design and implementation requirements. For example, at step 206, the message modification suggestion program 108A, 108B (FIG. 1) may use a natural language processing tool to analyze the received user messages. Furthermore, at step 208, the message modification suggestion program 108A, 108B (FIG. 1) may determine the user expertise levels based on threshold values. Specifically, according to one embodiment, the message modification suggestion program 108A, 108B (FIG. 1) may use the threshold values to determine whether the user is a novice, intermediate, or expert. More specifically, the message modification suggestion program 108A, 108B (FIG. 1) may use threshold values such as less than 0.4 is a novice, between 0.4 and 0.8 is an intermediate, and greater than 0.8 is an expert. For example, based on the collected and analyzed user information, such as the number of times a user logs on to a communication application and the number of previous user messages on the communication application, the message modification suggestion program 108A, 108B (FIG. 1) may determine that the user is below the 0.4 threshold value, and therefore, is a novice.

Furthermore, the message modification suggestion program 108A, 108B (FIG. 1) may use threshold values to determine the message precision levels. Specifically, according to one embodiment, the message modification suggestion program 108A, 108B (FIG. 1) may use threshold values such as less than 40% is imprecise, between 40% and 60% is moderately precise, and greater than 60% is precise. Also, according to one embodiment, the message modification suggestion program 108A, 108B (FIG. 1) may calculate a score for the received user messages based on the collected and analyzed communication application data, and may use the calculated score and the determined threshold value associated with the user expertise level to determine the message precision levels.

Figure 3:
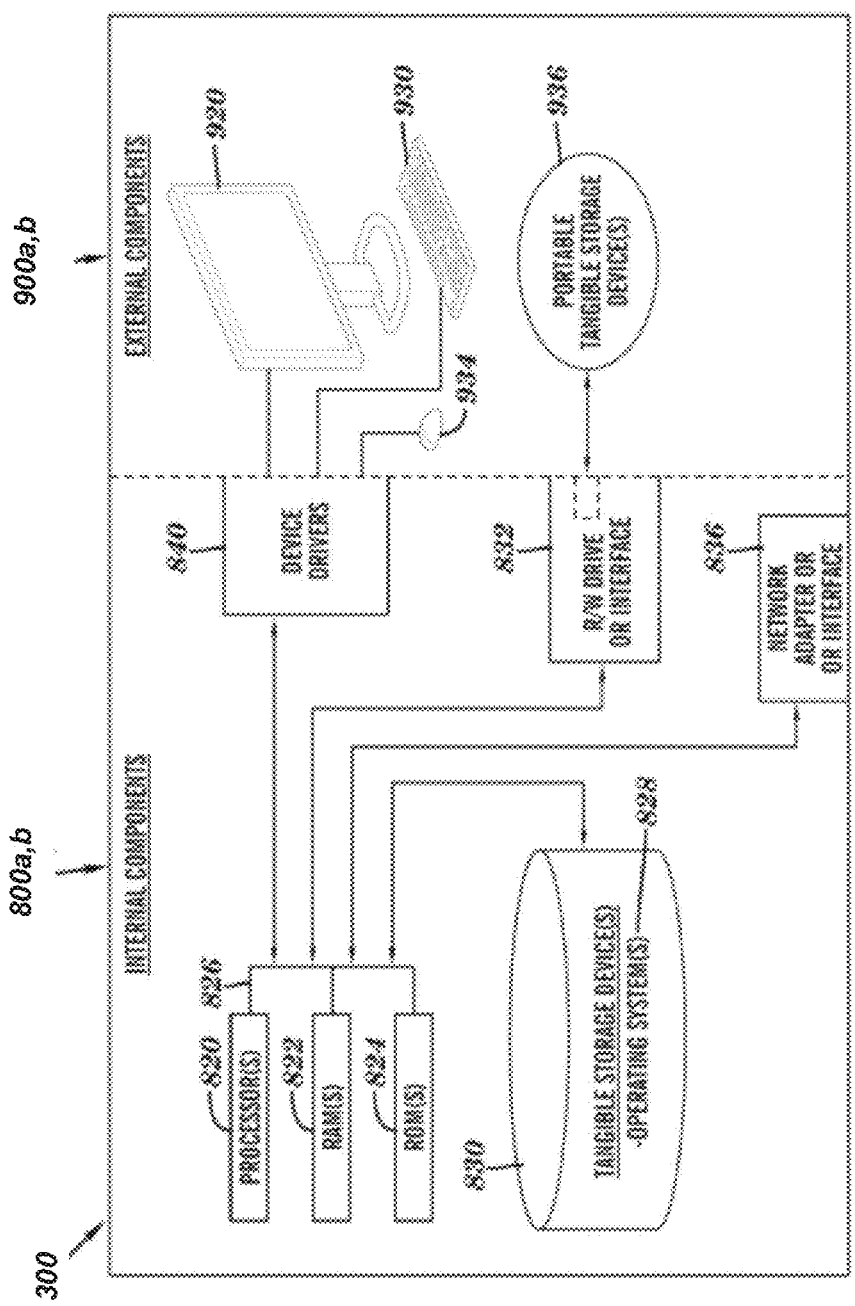
FIG. 3 is a block diagram of the system architecture of a program for providing suggested modifications to user messages according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 3. Each of the sets of internal components 800 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the message modification suggestion program 108A (FIG. 1) in client computer 102 (FIG. 1), and the message modification suggestion program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a message modification suggestion program 108A and 108B (FIG. 1), can be stored on one or more of the respective portable computer-readable tangible storage devices 936, read via the respective R/W drive or interface 832, and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The message modification suggestion program 108A (FIG. 1) and software program 114 (FIG. 1) in client computer 102 (FIG. 1), and the message modification suggestion program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the message modification suggestion program 108A (FIG. 1) and software program 114 (FIG. 1) in client computer 102 (FIG. 1) and the message modification suggestion program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 a, b can include a computer display monitor 920, a keyboard 930, and a computer mouse 934. External components 820 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
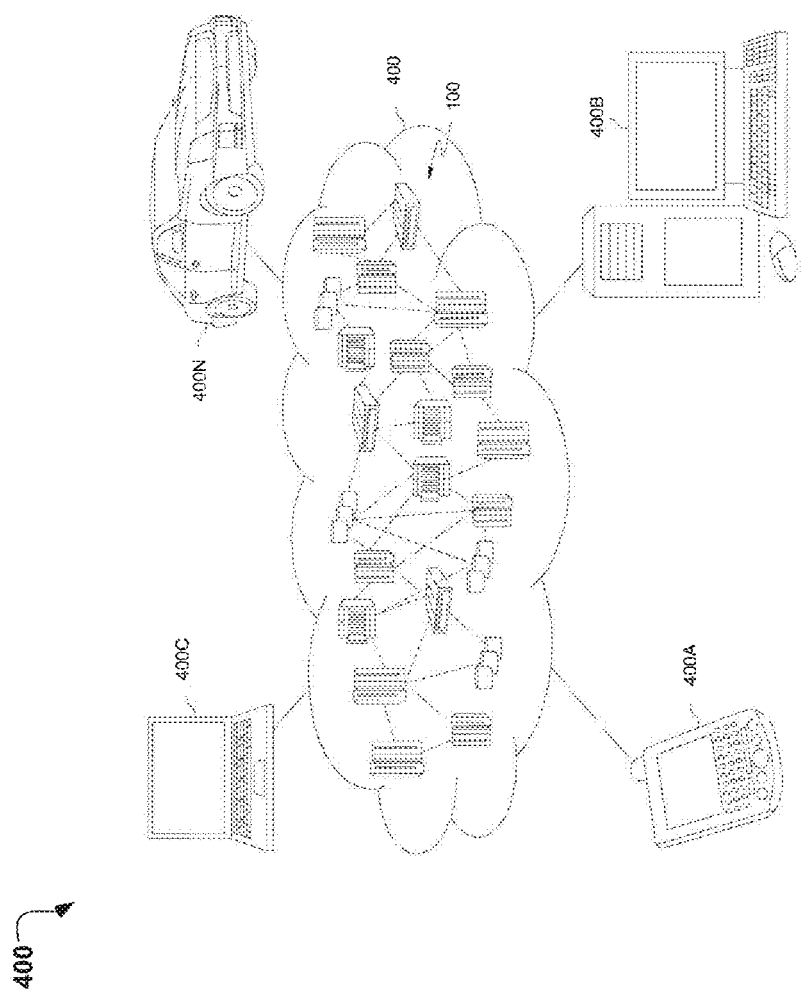
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
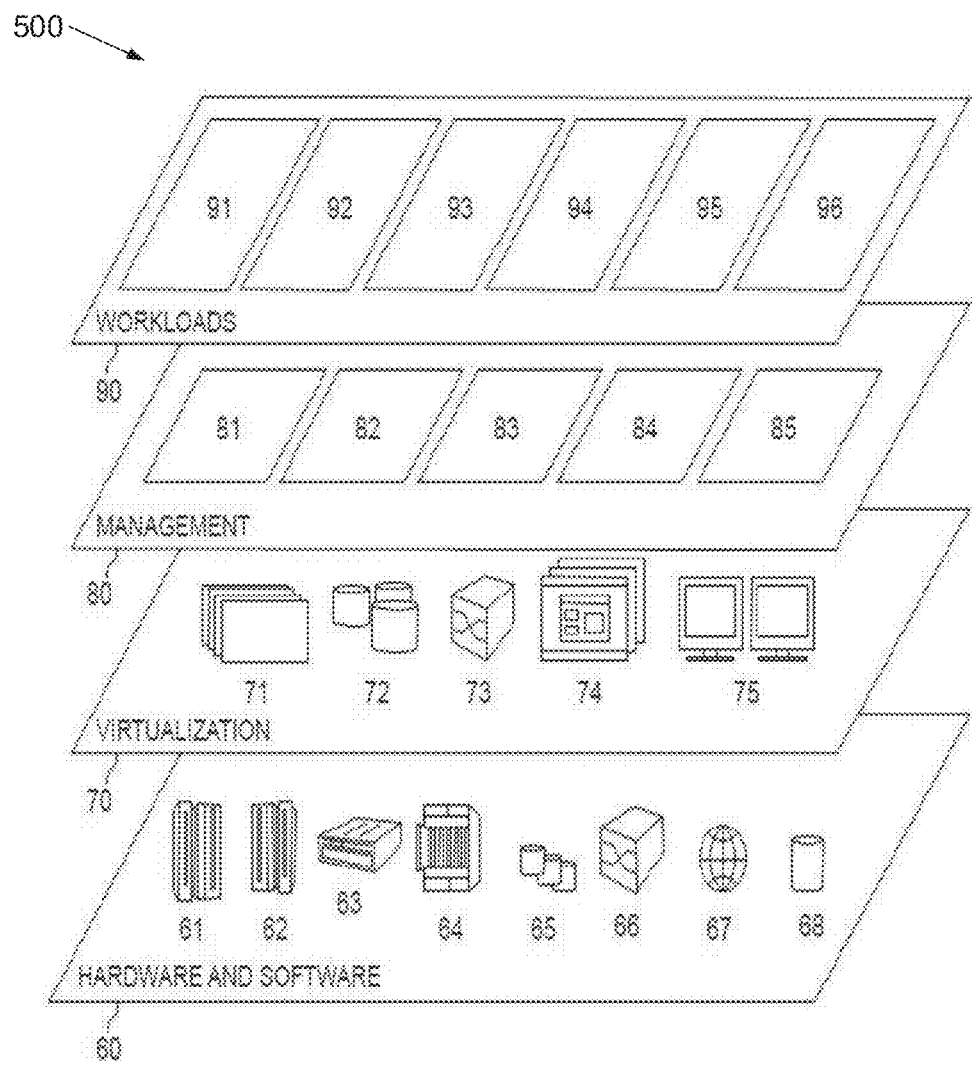
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message modification suggestion 96. A message modification suggestion program 108A, 108B (FIG. 1) may be offered "as a service in the cloud" (i.e., Software as a Service (SaaS)) for applications running on mobile devices 102 (FIG. 1) and may provide suggested modifications to user messages.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing at least one suggested modification to at least one user message, the method comprising:
   receiving the at least one user message associated with at least one communication application in response to a user action associated with at least one user;
   collecting a plurality of communication application data based on the received at least one user message, wherein the plurality of communication application data comprises a plurality of user information associated with the at least one user and a plurality of group information associated with at least one group that is addressed by the received at least one user message;
   analyzing the collected plurality of communication application data;
   determining at least one user expertise level associated with the at least one user based on the analyzed plurality of communication application data;
   determining at least one message precision level associated with the received at least one user message based on the analyzed plurality of communication application data and the determined at least one expertise level;
   providing the at least one suggested modification to the received at least one user message based on the analyzed plurality of communication application data, the determined at least one user expertise level, and the determined at least one message precision level, wherein providing the at least one suggested modification comprises presenting a pop-up dialogue box to initiate a chat session between the at least one user and a moderator, and wherein the pop-up dialogue box comprises at least one comment to revise the received at least one user message and displays one or more previous messages that are similar to the received at least one user message based on the plurality of group information; and
   posting at least one version of the received at least one user message on the at least one communication application, wherein the at least one version of the received at least one user message is based on the at least one user editing or not editing the received at least one user message in response to the provided at least one suggested modification.

2. The method of claim 1, wherein the plurality of user information is selected from a group consisting of at least one of a plurality of user profile information, a user location, a plurality of user activity, a user last login, a plurality of terms used in the received at least one user message, a plurality of previous user messages, or a plurality of frequent terms used in the plurality of previous user messages.

3. The method of claim 1, wherein the plurality of group information is selected from a group consisting of at least one of a plurality of group profile information, a group location, a plurality of group activity, a plurality of previous group messages, and a plurality of frequent terms used in the plurality of previous group messages.

4. The method of claim 1, wherein analyzing the collected plurality of communication application data further comprises:
   using a natural language processing tool to analyze a plurality of terms associated with the received at least one user message; and
   comparing the plurality of user information to the plurality of group information.

5. The method of claim 1, wherein determining the at least one user expertise level associated with the at least one user further comprises:
   determining whether the at least one user is a novice, an intermediate, or an expert based on the analyzed plurality of communication application data.

6. The method of claim 1, wherein determining at least one message precision level associated with the received at least one user message further comprises:
   determining whether the received at least one user message is imprecise, moderately precise, or precise based on the analyzed plurality of communication application data and the determined at least one user expertise level.

7. A computer system for providing at least one suggested modification to at least one user message, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving the at least one user message associated with at least one communication application in response to a user action associated with at least one user;
   collecting a plurality of communication application data based on the received at least one user message, wherein the plurality of communication application data comprises a plurality of user information associated with the at least one user and a plurality of group information associated with at least one group that is addressed by the received at least one user message;

analyzing the collected plurality of communication application data;

determining at least one user expertise level associated with the at least one user based on the analyzed plurality of communication application data;

determining at least one message precision level associated with the received at least one user message based on the analyzed plurality of communication application data and the determined at least one expertise level;

providing the at least one suggested modification to the received at least one user message based on the analyzed plurality of communication application data, the determined at least one user expertise level, and the determined at least one message precision level, wherein providing the at least one suggested modification comprises presenting a pop-up dialogue box to initiate a chat session between the at least one user and a moderator, and wherein the pop-up dialogue box comprises at least one comment to revise the received at least one user message and displays one or more previous messages that are similar to the received at least one user message based on the plurality of group information; and posting at least one version of the received at least one user message on the at least one communication application, wherein the at least one version of the received at least one user message is based on the at least one user editing or not editing the received at least one user message in response to the provided at least one suggested modification.

8. The computer system of claim 7, wherein the plurality of user information is selected from a group consisting of at least one of a plurality of user profile information, a user location, a plurality of user activity, a user last login, a plurality of terms used in the received at least one user message, a plurality of previous user messages, or a plurality of frequent terms used in the plurality of previous user messages.

9. The computer system of claim 7, wherein the plurality of group information is selected from a group consisting of at least one of a plurality of group profile information, a group location, a plurality of group activity, a plurality of previous group messages, and a plurality of frequent terms used in the plurality of previous group messages.

10. The computer system of claim 7, wherein analyzing the collected plurality of communication application data further comprises:

using a natural language processing tool to analyze a plurality of terms associated with the received at least one user message; and comparing the plurality of user information to the plurality of group information.

11. The computer system of claim 7, wherein determining the at least one user expertise level associated with the at least one user further comprises:

determining whether the at least one user is a novice, an intermediate, or an expert based on the analyzed plurality of communication application data.

12. The computer system of claim 7, wherein determining at least one message precision level associated with the received at least one user message further comprises:

determining whether the received at least one user message is imprecise, moderately precise, or precise based on the analyzed plurality of communication application data and the determined at least one user expertise level.

13. A non-transitory computer readable medium for providing at least one suggested modification to at least one user message, comprising:

one or more computer-readable storage devices and program instructions stored on at least one of the one or more computer-readable storage devices, the program instructions executable by a processor, the program instructions comprising:

program instructions to receive the at least one user message associated with at least one communication application in response to a user action associated with at least one user;

program instructions to collect a plurality of communication application data based on the received at least one user message, wherein the plurality of communication application data comprises a plurality of user information associated with the at least one user and a plurality of group information associated with at least one group that is addressed by the received at least one user message;

program instructions to analyze the collected plurality of communication application data;

program instructions to determine at least one user expertise level associated with the at least one user based on the analyzed plurality of communication application data;

program instructions to determine at least one message precision level associated with the received at least one user message based on the analyzed plurality of communication application data and the determined at least one expertise level;

program instructions to provide the at least one suggested modification to the received at least one user message based on the analyzed plurality of communication application data, the determined at least one user expertise level, and the determined at least one message precision level, wherein the program instructions to provide the at least one suggested modification comprises program instructions to present a pop-up dialogue box to initiate a chat session between the at least one user and a moderator, and wherein the pop-up dialogue box comprises at least one comment to revise the received at least one user message and displays one or more previous messages that are similar to the received at least one user message based on the plurality of group information; and program instructions to post at least one version of the received at least one user message on the at least one communication application, wherein the at least one version of the received at least one user message is based on the at least one user editing or not editing the received at least one user message.

14. The non-transitory computer readable medium of claim 13, wherein the plurality of user information is selected from a group consisting of at least one of a plurality of user profile information, a user location, a plurality of user activity, a user last login, a plurality of terms used in the received at least one user message, a plurality of previous user messages, or a plurality of frequent terms used in the plurality of previous user messages; and wherein the plurality of group information is selected from a group consisting of at least one of a plurality of group profile information, a group location, a plurality of group activity, a plurality of previous group messages, and a plurality of frequent terms used in the plurality of previous group messages.

15. The non-transitory computer readable medium of claim 13, wherein the program instructions to analyze the collected plurality of communication application data further comprises:

program instructions to use a natural language processing tool to analyze a plurality of terms associated with the received at least one user message; and program instructions to compare the plurality of user information to the plurality of group information.

16. The non-transitory computer readable medium of claim 13, wherein the program instructions to determine the at least one user expertise level associated with the at least one user further comprises:

program instructions to determine whether the at least one user is a novice, an intermediate, or an expert based on the analyzed plurality of communication application data.

17. The non-transitory computer readable medium of claim 13, wherein the program instructions to determine at least one message precision level associated with the received at least one user message further comprises:

program instructions to determine whether the received at least one user message is imprecise, moderately precise, or precise based on the analyzed plurality of communication application data and the determined at least one user expertise level.

* * * * *